(12) United States Patent
Vasudevan et al.

(10) Patent No.: US 7,783,769 B2
(45) Date of Patent: Aug. 24, 2010

(54) ACCELERATED TCP (TRANSPORT CONTROL PROTOCOL) STACK PROCESSING

(75) Inventors: Anil Vasudevan, Portland, OR (US); Dennis Michael Bell, Beaverton, OR (US); David B. Minturn, Beaverton, OR (US); Sujoy Sen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 970 days.

(21) Appl. No.: 10/815,895

(22) Filed: Mar. 31, 2004

(65) Prior Publication Data
US 2005/0223128 A1 Oct. 6, 2005

(51) Int. Cl.
*G06F 15/16* (2006.01)
(52) U.S. Cl. .................................. 709/230; 709/227
(58) Field of Classification Search ............... 709/220, 709/230, 200, 201, 249
See application file for complete search history.

(56) References Cited

U.S. PATENT DOCUMENTS

| 5,090,011 | A | 2/1992 | Fukuta et al. |
|---|---|---|---|
| 6,314,100 | B1 | 11/2001 | Roach et al. |
| 6,389,468 | B1 | 5/2002 | Muller et al. |
| 6,438,604 | B1 | 8/2002 | Kuver et al. |
| 6,675,200 | B1 * | 1/2004 | Cheriton et al. ............. 709/212 |
| 6,751,709 | B2 * | 6/2004 | Seidl et al. .................. 711/137 |
| 6,907,042 | B1 | 6/2005 | Oguchi |
| 6,986,046 | B1 | 1/2006 | Tuvell et al. |
| 7,012,918 | B2 | 3/2006 | Williams |
| 7,089,344 | B1 | 8/2006 | Rader et al. |
| 7,142,540 | B2 | 11/2006 | Hendel et al. |
| 7,181,531 | B2 | 2/2007 | Pinkerton |
| 7,668,165 | B2 | 2/2010 | Hoskote et al. |
| 2002/0174255 | A1 | 11/2002 | Hayter et al. |
| 2003/0014544 | A1 * | 1/2003 | Pettey .......................... 709/249 |
| 2003/0169738 | A1 | 9/2003 | McDaniel |
| 2003/0217231 | A1 * | 11/2003 | Seidl et al. .................. 711/137 |
| 2004/0013117 | A1 * | 1/2004 | Hendel et al. ............... 370/394 |

(Continued)

FOREIGN PATENT DOCUMENTS

EP 0574140 A1 12/1993

(Continued)

OTHER PUBLICATIONS

The Written Opinion of the International Searching Authority, mailed Oct. 12, 2006.

(Continued)

*Primary Examiner*—Ramy M Osman
*Assistant Examiner*—Marshall McLeod
(74) *Attorney, Agent, or Firm*—Grossman, Tucker, Perreault & Pfleger, PLLC (57) ABSTRACT

In one embodiment, a method is provided. The method of this embodiment provides receiving an indication on a network component that one or more packets have been received from a network; the network component notifying a TCP-A (transport control protocol—accelerated) driver that the one or more packets have arrived; a TCP-A driver performing packet processing for at least one of the one or more packets; and the TCP-A driver performing one or more operations that result in a data movement module placing one or more corresponding payloads of the at least one of the one or more packets into a read buffer.

13 Claims, 4 Drawing Sheets

U.S. PATENT DOCUMENTS

| | | |
|---|---|---|
| 2004/0030806 A1 | 2/2004 | Pandya |
| 2004/0054837 A1 | 3/2004 | Biran et al. |
| 2004/0225748 A1 | 11/2004 | Chong |
| 2005/0223128 A1 | 10/2005 | Vasudevan et al. |
| 2005/0223134 A1 | 10/2005 | Vasudevan |
| 2006/0075142 A1 | 4/2006 | Cornett |
| 2008/0126553 A1 | 5/2008 | Boucher et al. |

FOREIGN PATENT DOCUMENTS

| | | |
|---|---|---|
| EP | 0642246 A2 | 3/1995 |
| EP | 0657824 A1 | 6/1995 |
| JP | 06078001 A | 3/1994 |
| JP | 07078112 A | 3/1995 |
| JP | 07221780 A | 8/1995 |
| JP | 2000332817 A | 11/2000 |
| WO | 2005104486 | 11/2005 |

OTHER PUBLICATIONS

Makineni, S. et al, "Performance Characterization of TCP/IP Packet Processing in Commercial Server Workloads", IEEE—Conference Proceedings Article, 2003. pp. 33-41, XP01067.

Office Action Received for EP Patent Application No. 04756431.5, mailed on Oct. 1, 2007. pp. 3.

Office Action Received for SG Patent Application No. 200606011-5, mailed on Feb. 13, 2007. pp. 10.

Office Action Received for KR Patent Application No. 2006-7020469, mailed on Mar. 28, 2007; English Translation 3 pages.

Notice of Allowance Received for KR Patent Application No. 2006-7020469, and Allowed Claims, mailed on Nov. 28, 2007. 10 pages.

Notice of Allowance Received for TW Patent Application No. 93119637, mailed on Dec. 20, 2006. pp. 3.

Office Action Received for US Patent U.S. Appl. No. 10/973,790, mailed on May 30, 2008. pp. 15.

Office Action Received for US Patent U.S. Appl. No. 11/027,719, mailed on Jun. 13, 2008. pp. 15.

International Preliminary Report on Patentability for PCT Patent Application No. PCT/US2004/021015, mailed on Oct. 12, 2006. pp. 8.

International Search Report/Written Opinion for PCT Patent Application No. PCT/US2004/021015, mailed on Dec. 23, 2004. pp. 12.

Notice of Allowance received for SG Application No. 200606011-5 mailed on Jun. 25, 2008. pp. 8.

Non Final Office Action received for U.S. Appl. No. 11/140,092, mailed Sep. 29, 2008.

Notice of Allowance received for U.S. Appl. No. 10/973,790 mailed on Dec. 30, 2008.

Office Action received for JP Patent Application No. 2007-502782 mailed on Feb. 3, 2009, 3 pages and English translation of 2 pages.

Office Action received for U.S. Appl. No. 11/140,092 Mailed on Mar. 24, 2009, 20 Pages.

Office Action received for U.S. Appl. No. 11/027,719 Mailed on May 7, 2009, 19 Pages.

Notice of Allowance received for U.S. Appl. No. 10/973,790, mailed on Sep. 29, 2009. pp. 7.

Non-Final Office Action received for U.S. Appl. No. 11/140,092 Mailed on Jul. 21, 2009; 17 pages.

Office Action received for Chinese Patent Application No. 200480042550.4, Mailed on Aug. 14, 2009, 4 pages of Office Action and English translation of 7 pages.

Non-Final Office Action received for U.S. Appl. No. 11/027,719, Mailed on Nov. 9, 2009, pp. 18.

Office Action received for Japanese Patent Application No. 2007-502782, Mailed on Aug. 4, 2009, 3 pages of Office Action and English translation of 2 pages.

Final Office Action received for U.S. Appl. No. 11/140,092, mailed on Jan. 5, 2010, 17 pages.

Notice of Allowance received for U.S. Appl. No. 10/973,790, mailed on Feb. 22, 2010, 4 pages.

Final Office Action received for U.S. Appl. No. 11/027,719, mailed on Apr. 5, 2010, 15 pages.

Notice of Allowance received for U.S. Appl. No. 10/973,790, mailed on Apr. 1, 2010, 2 pages.

Supplemental Notice of Allowability received for U.S. Appl. No. 10/973,790 mailed on Apr. 26, 2010, 2 pages.

Non-Final Office Action received for U.S. Appl. No. 11/140,092, mailed on May 13, 2010, pp. 16.

* cited by examiner

ACCELERATED TCP (TRANSPORT CONTROL PROTOCOL) STACK PROCESSING

FIELD

Embodiments of this invention relate to accelerated TCP (Transport Control Protocol) stack processing.

BACKGROUND

Networking has become an integral part of computer systems. Advances in network bandwidths, however, have not been fully utilized due to overhead that may be associated with processing protocol stacks. Overhead may result from bottlenecks in the computer system from using the core processing module of a host processor to perform slow memory access functions such as data movement, as well as host processor stalls related to data accesses missing the host processor caches. A protocol stack refers to a set of procedures and programs that may be executed to handle packets sent over a network, where the packets may conform to a specified protocol. For example, TCP/IP (Transport Control Protocol/Internet Protocol) packets may be processed using a TCP/IP stack.

One approach to reducing overhead is to partition protocol stack processing. For example, TCP/IP stack processing may be offloaded onto a TCP/IP offload engine (hereinafter "TOE"). In TOE, the entire TCP/IP stack may be offloaded onto a networking component, such as a MAC (media access control) component, of an I/O subsystem, such as a NIC (network interface card). However, a TOE may not be scalable to support a large number of connections due to the memory requirements associated with storing contexts associated with these connections.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Examples described below are for illustrative purposes only, and are in no way intended to limit embodiments of the invention. Thus, where examples may be described in detail, or where a list of examples may be provided, it should be understood that the examples are not to be construed as exhaustive, and do not limit embodiments of the invention to the examples described and/or illustrated.

Figure 1:
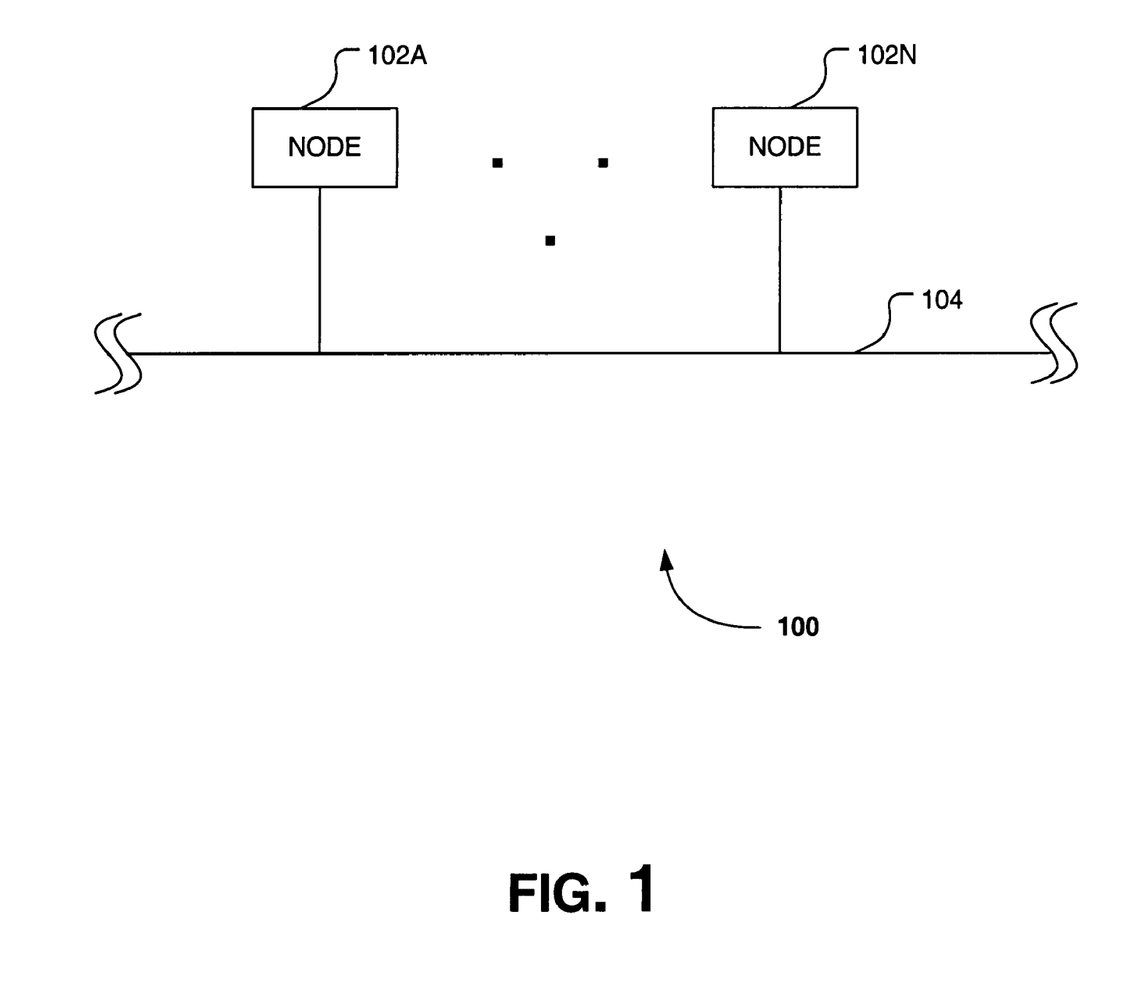
FIG. 1 illustrates a network.

FIG. 1 illustrates a network 100 in which embodiments of the invention may operate. Network 100 may comprise a plurality of nodes 102A, . . . 102N, where each of nodes 102A, . . . 102N may be communicatively coupled together via a communication medium 104. As used herein, components that are "communicatively coupled" means that the components may be capable of communicating with each other via wirelined (e.g., copper wires), or wireless (e.g., radio frequency) means. Nodes 102A . . . 102N may transmit and receive sets of one or more signals via medium 104 that may encode one or more packets.

As used herein, a "packet" means a sequence of one or more symbols and/or values that may be encoded by one or more signals transmitted from at least one sender to at least one receiver. As used herein, a "communication medium" means a physical entity through which electromagnetic radiation may be transmitted and/or received. Communication medium 104 may comprise, for example, one or more optical and/or electrical cables, although many alternatives are possible. For example, communication medium 104 may comprise air and/or vacuum, through which nodes 102A . . . 102N may wirelessly transmit and/or receive sets of one or more signals.

In network 100, one or more of the nodes 102A . . . 102N may comprise one or more intermediate stations, such as, for example, one or more hubs, switches, and/or routers; additionally or alternatively, one or more of the nodes 102A . . . 102N may comprise one or more end stations. Also additionally or alternatively, network 100 may comprise one or more not shown intermediate stations, and medium 104 may communicatively couple together at least some of the nodes 102A . . . 102N and one or more of these intermediate stations. Of course, many alternatives are possible.

Figure 2:
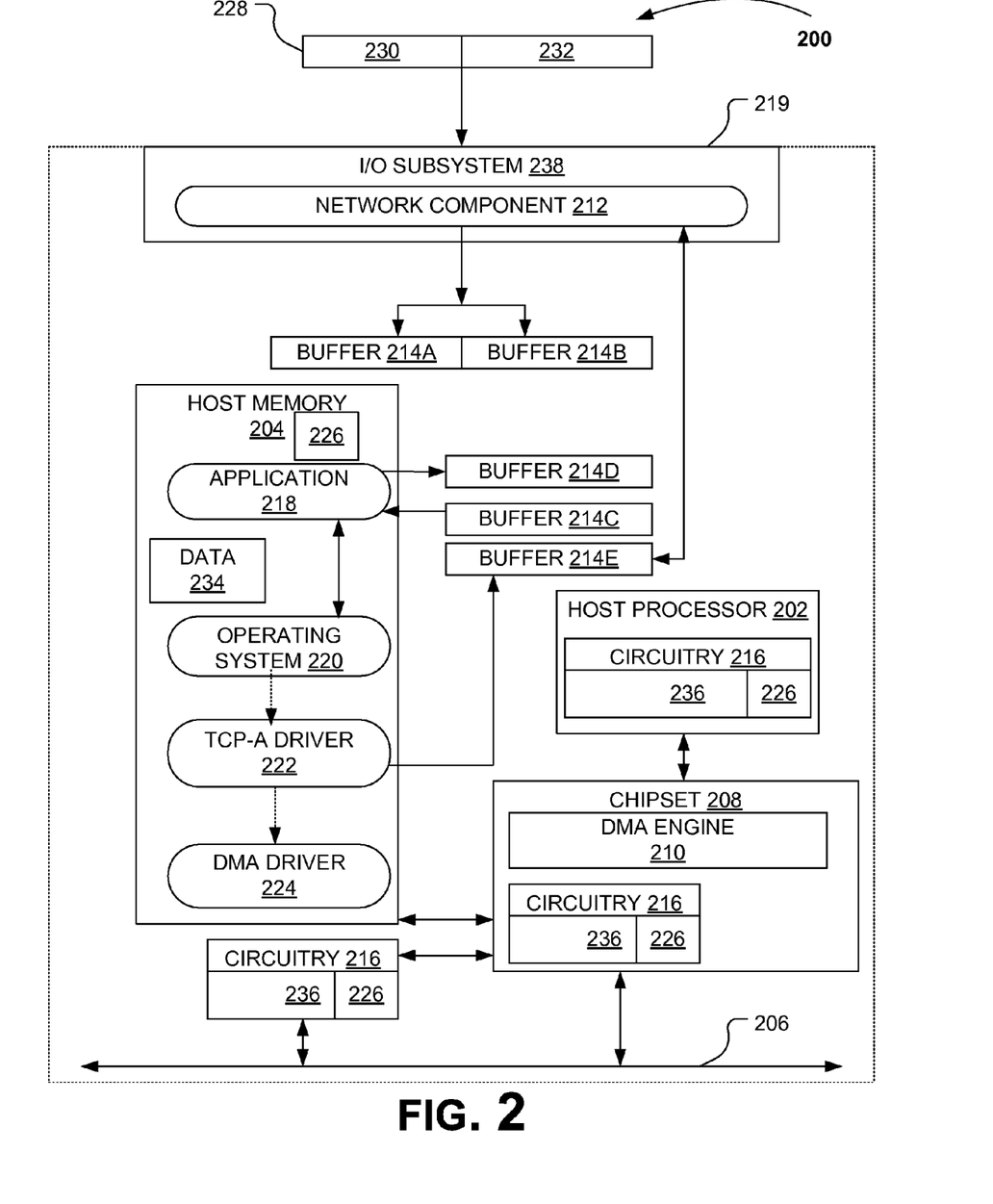
FIG. 2 illustrates a system according to one embodiment.

At least one of nodes 102A, . . . , 102N may comprise system 200, as illustrated in FIG. 2. System 200 may comprise host processor 202, host memory 204, bus 206, and chipset 208. (System 200 may comprise more than one host processor 202, host memory 204, bus 206, and chipset 208, or other types of processors, memories, and busses; however, the former are illustrated for simplicity of discussion, and are not intended to limit embodiments of the invention.) Host processor 202, host memory 204, bus 206, and chipset 208 may be comprised in a single circuit board, such as, for example, a system motherboard 219.

Host processor 202 may comprise a core processing module and other support modules that interface with other system elements. For example, a support module may include a bus unit that communicates with a memory controller on system 200. Host processor 202 may comprise, for example, an Intel® Pentium® microprocessor that is commercially available from the Assignee of the subject application. Of course, alternatively, host processor 202 may comprise another type of microprocessor, such as, for example, a microprocessor that is manufactured and/or commercially available from a source other than the Assignee of the subject application, without departing from embodiments of the invention.

Host processor 202 may be communicatively coupled to chipset 208. Chipset 208 may comprise a host bridge/hub system that may couple host processor 202 and host memory 204 to each other and to bus 206. Chipset 208 may also include an I/O bridge/hub system (not shown) that may couple the host bridge/bus system to bus 206. Chipset 208 may comprise one or more integrated circuit chips, such as those selected from integrated circuit chipsets commercially available from the Assignee of the subject application (e.g., graphics memory and I/O controller hub chipsets), although other one or more integrated circuit chips may also, or alternatively, be used.

Bus 206 may comprise a bus that complies with the Peripheral Component Interconnect (PCI) Local Bus Specification, Revision 2.2, Dec. 18, 1998 available from the PCI Special Interest Group, Portland, Oreg., U.S.A. (hereinafter referred to as a "PCI bus"). Alternatively, bus 206 instead may comprise a bus that complies with the PCI-X Specification Rev.

1.0a, Jul. 24, 2000, (hereinafter referred to as a "PCI-X bus"), or a bus that complies with the PCI-E Specification Rev. PCI-E (hereinafter referred to as a "PCI-E bus"), as specified in "The PCI Express Base Specification of the PCI Special Interest Group", Revision 1.0a, both available from the aforesaid PCI Special Interest Group, Portland, Oreg., U.S.A. Also, alternatively, bus 106 may comprise other types and configurations of bus systems.

System 200 may additionally comprise circuitry 216. Circuitry 216 may comprise one or more circuits to perform one or more operations described herein as being performed by TCP-A (Transport Control Protocol—Accelerated) driver 222 and/or network component 212. Circuitry 216 may be hardwired to perform the one or more operations, and/or may execute machine-executable instructions to perform these operations. For example, circuitry 216 may comprise memory 236 that may store machine-executable instructions 226 that may be executed by circuitry 216 to perform these operations. Instead of being comprised in host processor 202, or chipset 208, some or all of circuitry 216 may be comprised in a circuit card (not shown), and/or other structures, systems, and/or devices that may be, for example, comprised in motherboard 219, and/or communicatively coupled to bus 206, and may exchange data and/or commands with one or more other components in system 200. Circuitry 216 may comprise, for example, one or more digital circuits, one or more analog circuits, one or more state machines, programmable circuitry, and/or one or more ASIC's (Application-Specific Integrated Circuits).

System 200 may additionally comprise one or more memories to store machine-executable instructions 226 capable of being executed, and/or data capable of being accessed, operated upon, and/or manipulated by circuitry, such as circuitry 216. For example, these one or more memories may include host memory 204, or memory 236. One or more memories 204, 236 may, for example, comprise read only, mass storage, random access computer-readable memory, and/or one or more other types of machine-readable memory. The execution of program instructions 226 and/or the accessing, operation upon, and/or manipulation of data by circuitry 216 may result in, for example, circuitry 216 carrying out some or all of the operations described herein as being carried out by various hardware and/or software components in system 200.

For example, machine-executable instructions 226 may comprise a set of instructions for an application 218; a set of instructions for operating system 220; a set of instructions for TCP-A driver 222; and/or a set of instructions for DMA driver 224. In one embodiment, circuitry 216 of host processor 202 may execute machine-executable instructions 226 for TCP-A driver 222, for DMA driver 224, and for operating system 220. Machine-executable instructions 226 may execute in memory by circuitry 216, such as in host processor 202, and/or by circuitry 216 in general.

Figure 3:
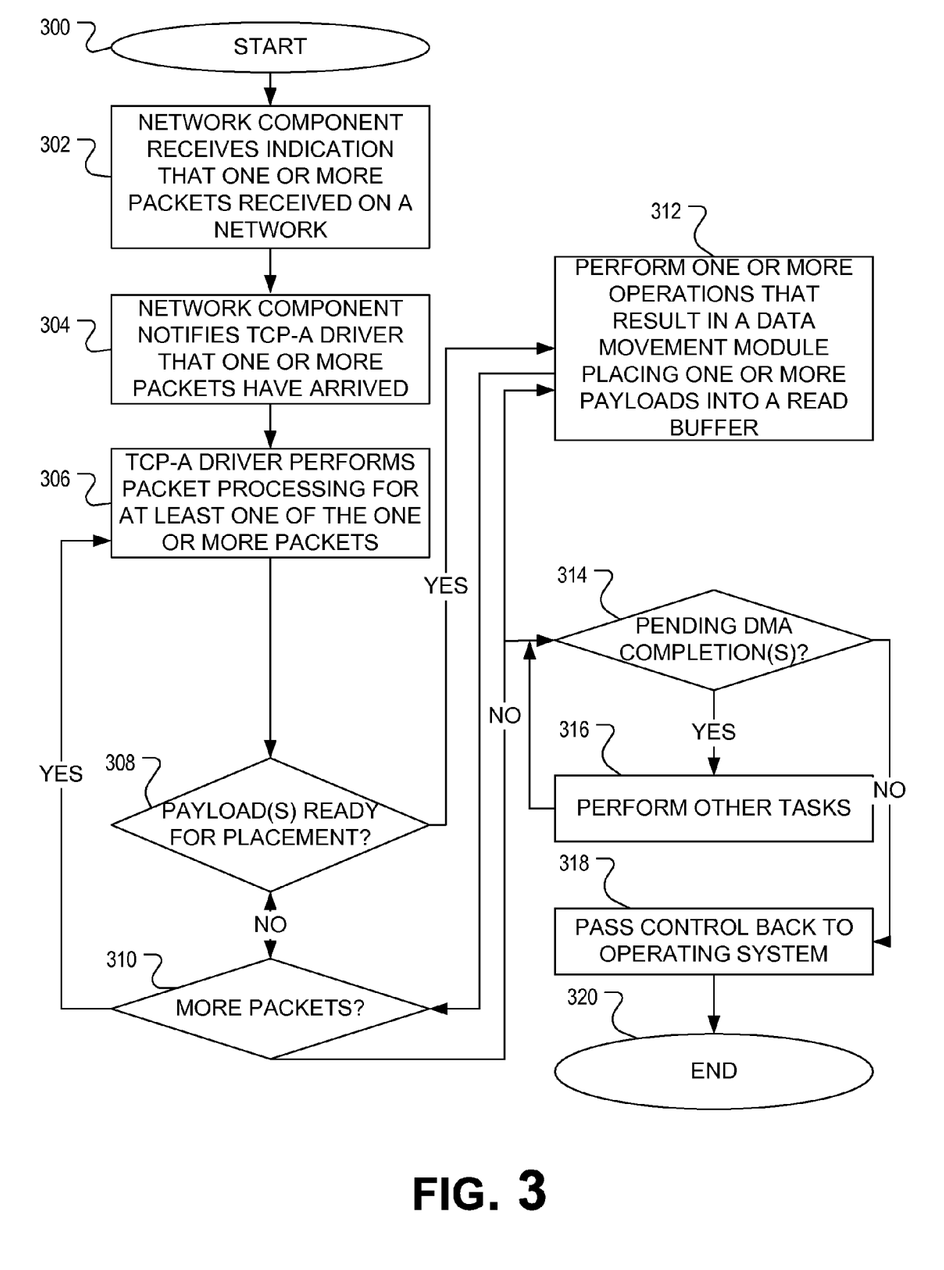
FIG. 3 is a flowchart illustrating a method according to one embodiment.

A method according to one embodiment is illustrated in the flowchart of FIG. 3 with reference to system 200 of FIG. 2. The method begins at block 300, and continues to block 302 where network component 212 may receive an indication that one or more packets 228 (only one shown) have been received from network 100. Each packet 228 may comprise a header 230 and a payload 232. For each packet 228, network component 212 may split header 230 and payload 232 from packet 228, and post each header 230, and payload 232 to one or more post buffers 214A, 214B. In one embodiment, header 230 may be posted to a first buffer such as post buffer 214A, and payload 232 may be posted to a second buffer such as post buffer 214B. The one or more packets 228 may be comprised in one or more groups, and each group of packets 228 may be transmitted and/or received over a connection. The one or more packets 228 may be received in response to a read data request from, for example, application 218.

"Application" refers to one or more programs that use the network. An application 218 may comprise, for example, a web browser, an email serving application, a file serving application, or a database application. In conjunction with a read data request, application 218 may designate destination read buffer 214C where application 218 may access the requested data. In conjunction with a transmit data request, application 218 may write data to be transmitted to source buffer 214D.

"Network component" refers to any combination of hardware and/or software on an I/O (input/output) subsystem that may process one or more packets sent and/or received over a network. In one embodiment, I/O subsystem 238 may comprise, for example, a NIC (network interface card), and network component 212 may comprise, for example, a MAC (media access control) layer of the Data Link Layer as defined in the Open System Interconnection (OSI) model for networking protocols. The OSI model is defined by the International Organization for Standardization (ISO) located at 1 rue de Varembé, Case postale 56 CH-1211 Geneva 20, Switzerland.

A "connection" as used herein refers to a logical pathway to facilitate communications between a first node on a network and a second node on the network. A connection may facilitate communications for one or more transactions between the first node and the second node. A "transaction" refers to a request to send or receive data, such as may be initiated by an application, such as application 218, on a system, such as system 200. Each connection may be associated with a protocol context. As used herein, "protocol context" refers to information about a connection. For example, the information may comprise the sequence number of the last packet sent/received, and amount of memory available.

At block 304, network component 212 may notify TCP-A driver that one or more packets 228 have arrived. In one embodiment, network component 212 may notify TCP-A driver 222 by notifying operating system 220 in accordance with an interrupt moderation scheme. An interrupt moderation scheme refers to a condition where an interrupt may be asserted for every n packets received by network component 212. Thus, if network component 212 receives n or more packets, network component 212 may notify operating system 220 that packets have arrived. Likewise, if network component 212 receives less than n packets, network component 212 may instead wait until more packets are received before notifying operating system 220. In one embodiment, operating system 220 may then notify TCP-A driver 222 that packets are ready to be processed.

At block 306, TCP-A driver 222 may perform packet processing for at least one of the one or more packets. Packet processing may be performed by the TCP-A driver 222 retrieving header 230 from post buffer 214A, parsing the header 230 to determine the protocol context associated with the current connection, and performing TCP protocol compliance. TCP protocol compliance may comprise, for example, verifying the sequence number of a received packet to ensure that the packet is within a range of numbers that was agreed upon between the communicating nodes; verifying the payload size to ensure that the packet is within a range of sizes that was agreed upon between the communicating nodes; ensuring that the header structure conforms to the protocol; and ensuring that the timestamps are within an expected time range.

TCP-A driver 222 may fetch a next header to process prior to completing the processing of a current header. This may ensure that the next header is available in the host processor's caches (not shown) before the TCP-A driver 222 is ready to perform TCP processing on it, thereby reducing host processor stalls. The method may continue to block 308.

In one embodiment, TCP-A driver 222 may additionally determine if a connection associated with a packet is to be accelerated prior to performing packet processing. TCP-A driver 222 may accelerate select connections. Select connections may comprise, for example, connections that are long-lived, or which comprise large data. If TCP-A driver 222 determines that network connection is to be accelerated, TCP-A driver 222 may perform packet processing as described at block 306. If TCP-A driver 222 determines that network connection is not to be accelerated, the method may continue to block 318.

At block 308, TCP-A driver 222 may determine if one or more payloads 232 placed in post buffer 214B are ready for placement. A payload 232 may be ready for placement if, for example, the corresponding header has been successfully processed, and a read buffer, such as read buffer 214C, has been designated. If at block 308, payload 232 is not ready for placement, the method may continue to block 310. In one embodiment, TCP-A driver 222 may determine if there are one or more payloads 232 ready for placement at anytime. For example, if it is determined that payload 232 is not ready for placement, TCP-A driver 222 may wait for some period of time before it makes this determination again. Where payload 232 cannot be placed because a read buffer 214C does not exist, for example, TCP-A driver 222 may alternatively or additionally at anytime indicate to operating system 220 the presence of payload 232 ready to be placed. Operating system 220 may then designate a buffer, or may ask application 218 to designate a buffer. If there are one or more payloads ready for placement, the method may continue to block 312.

At block 310, TCP-A driver 222 may determine if there are more packets 228 to process, for example in post buffer 214A, of the n packets for the current interrupt. If there are more packets 228 to process, the method reverts to block 306. If there are no more packets 228, and one or more packets 228 have not been previously placed, and are ready for placement, the method may continue to block 312. If there are no more packets 228 to process, and there are no previous packets 228 to place, the method may continue to block 314.

At block 312, TCP-A driver 222 may perform one or more operations that result in a data movement module placing one or more corresponding payloads 232 into a read buffer, such as read buffer 214C. As used herein, a "data movement module" refers to a module for moving data from a source to a destination without using the core processing module of a host processor, such as host processor 202. A data movement module may comprise, for example, a DMA engine as described below.

In one embodiment, for example, TCP-A driver 222 may send a request to DMA driver 224, and DMA driver 224 may schedule a request with DMA engine 210 to write the one or more payloads 232 from post buffer 214B to read buffer 214C. In another embodiment, TCP-A driver 222 may directly program DMA engine 210 to write the one or more payloads 232 from post buffer 214B to read buffer 214C. DMA driver 224 may be a standalone driver, or part of some other driver, such as TCP-A driver 222. Rather than being part of chipset 208, DMA engine 210 may be a support module of host processor 202. By using the DMA engine for placement of data, host processor 202 may be freed from the overhead of performing data movements, which may result in the host processor 202 running at much slower memory speeds compared to the core processing module speeds. Following the DMA engine 210 scheduling, the method may revert to block 310 to determine if there are additional packets 228 to process.

At block 314, TCP-A driver 222 may determine if there are any pending DMA completions for the current interrupt. Alternatively, TCP-A driver 222 may look for DMA completions at anytime. A "pending completion" as used herein refers to the completion of a request. In one embodiment, a pending completion refers to the completion of a request to DMA engine 210 to write one or more payloads 232. If, at block 314, there are one or more pending DMA completions for the current interrupt, the method may continue to block 316. If at block 314 there are no pending DMA completions for the current interrupt, the method may continue to block 318.

At block 316, TCP-A driver 222 may perform other tasks. Other tasks may include looking for more packets in a subsequent interrupt, setting up the DMA engine 210 to issue an interrupt upon completion of a last queued task for the current interrupt, or other housekeeping, such as transmitting data, and performing TCP timer related tasks.

At block 318, TCP-A driver 222 may pass control back to operating system 220. If one or more packets 228 have still not been processed, operating system 220 may notify a TCP driver (not shown) rather than TCP-A driver 222, where the TCP driver may perform TCP stack processing by performing packet processing, and by using the core processing module of host processor 202 to perform data transfers. If all packets 228 have been processed, operating system 220 may wait for a next interrupt.

The method may end at block 320.

Figure 4:
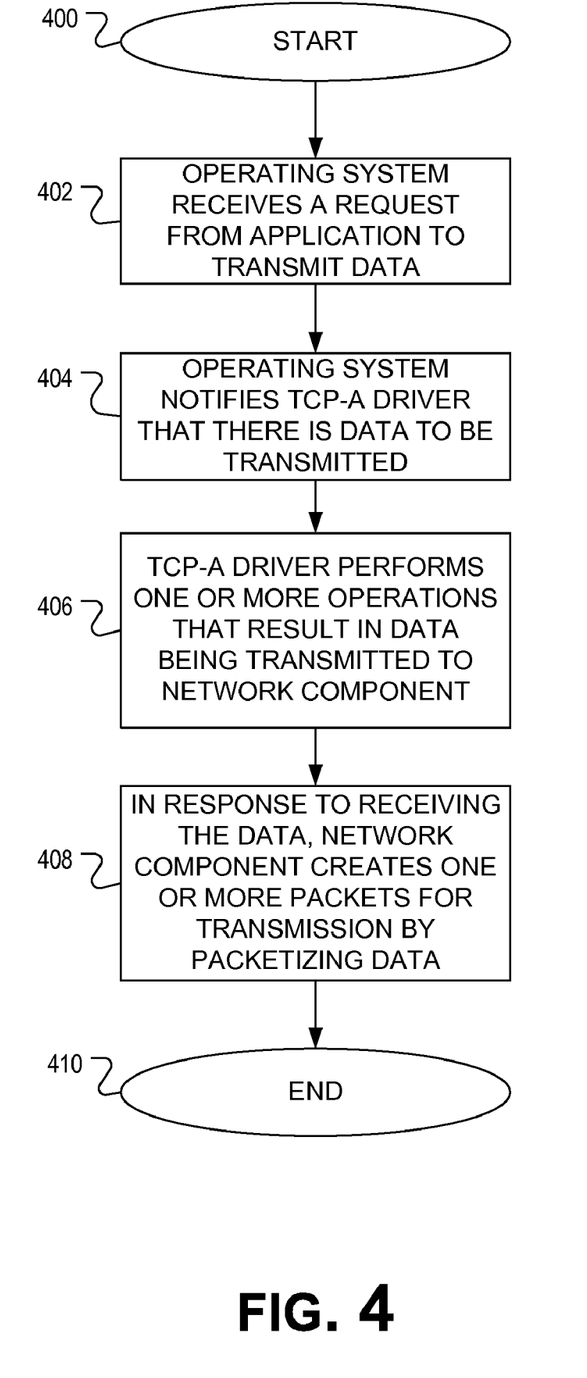
FIG. 4 is a flowchart illustrating a method according to another embodiment.

A method according to another embodiment is illustrated in FIG. 4. The method begins at block 400 and continues to block 402 where operating system 220 may receive a request from application 218 to transmit data 234 placed in buffer 214D. Operating system 220 may perform preliminary checks on data 234. Preliminary checks may include, for example, obtaining the associated protocol context. In a TCP/IP connection, for example, protocol context may comprise packet sequence numbers to identify the order of the packets, buffer addresses of buffers used to store data, and timer/timestamp information for retransmissions.

At block 404, operating system 220 may notify TCP-A driver 222 that there is data 234 to be transmitted from buffer 214D.

At block 406, TCP-A driver 222 may perform one or more operations that result in data 234 being transmitted to network component 212. For example, these one or more operations may include TCP-A driver 222 programming DMA engine 210 to transmit data 234 from source buffer 214D to network component 212. Alternatively, TCP-A driver 222 may queue a buffer, such as queued buffer 214E, to network component 212, where network component 212 may instead read data 234 from queued buffer 214E. Source buffer 214D may be designated by application 218, for example, and queued buffer 214E may be designated by network component 212, for example.

In one embodiment, TCP-A driver 222 may program DMA engine 210 to transmit data if the data is small, and TCP-A driver 222 may queue a buffer, such as queued buffer 214E, if the data is large. As used herein, "queuing a buffer" means to notify a component that there is a buffer from which it can access data. For example, TCP acknowledgment packets to acknowledge receipt of packets may typically be relatively small-sized packets, and may be sent by TCP-A driver 222 to network component 212 by TCP-A driver 222 programming DMA engine 210 to transmit data 234. As another example, storage applications that send large files over the network may be relatively large, and may therefore be sent by TCP-A driver 222 to network component 212 by queuing buffer 214E.

At block 408, in response to receiving the data, network component 212 may create one or more packets for transmission by packetizing the data. In one embodiment, network component 212 may packetize data by performing segmentation on the data. "Segmentation" refers to breaking the data into smaller pieces for transmission. In one embodiment, network component 212 may comprise a MAC, and segmentation may be referred to as a large send offload, wherein MAC frames may be created for transmission of data 234 over the network. Network component 212 may receive data directly from TCP-A driver 222, or by accessing queued buffer 214E.

The method may end at block 410. Thereafter, operating system 220 may send a completion notification to application 218. Furthermore, source buffer 214D may be returned to application 218, and application may use the buffer for other purposes.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

CONCLUSION

Therefore, in one embodiment, a method may comprise receiving an indication on a network component that one or more packets have been received from a network; the network component notifying a TCP-A (transport control protocol—accelerated) driver that the one or more packets have arrived; a TCP-A driver performing packet processing for at least one of the one or more packets; and the TCP-A driver performing one or more operations that result in a data movement module placing one or more corresponding payloads of the at least one of the one or more packets into a read buffer.

Embodiments of the invention may significantly reduce TCP/IP processing overhead that may result from using the core processing module of a host processor. TCP/IP processing may be accelerated by using a data movement module, such as a DMA engine, to move data from one buffer to another buffer. Since the core processing module of a host processor may be bypassed using a DMA engine, slow memory access speeds may be avoided. Furthermore, TCP/IP processing performed on the host processor may scale better than TOE processing because the number of contexts is not limited by TOE memory.

In the foregoing specification, the invention has been described with reference to specific embodiments thereof. It will, however, be evident that various modifications and changes may be made to these embodiments without departing therefrom. The specification and drawings are, accordingly, to be regarded in an illustrative rather than a restrictive sense.

What is claimed is:

1. A method for accelerating TCP (transport control protocol) processing by partitioning processing tasks between system elements in a way that scales with the elements, said method comprising:

receiving an indication on a network component that one or more packets have been received from a network;

splitting each of the one or more packets into a header and a payload and posting each header to a first buffer on a host and each payload to a second buffer on the host, using the network component;

notifying a TCP (transport control protocol) driver, by the network component, that the one or more packets have arrived;

performing, using the TCP driver, TCP stack processing by parsing the header in at least one of the one or more packets to determine the protocol context associated with a current connection, and performing, using the TCP driver, TCP protocol compliance for the at least one of the one or more packets; and performing one or more operations, using the TCP driver, that result in a data movement module retrieving one or more payloads of the at least one of the one or more packets from the second buffer and placing the one or more corresponding payloads into a read buffer wherein the data movement module comprises a DMA (direct memory access) engine; and performing, using the TCP driver, one or more operations that result in a data movement module placing one or more corresponding payloads of the at least one of the one or more packets into a read buffer comprises sending a request to a data movement module driver to write the one or more corresponding payloads to the read buffer; and receiving a request on an operating system to transmit data over the network; the operating system notifying the TCP driver that there is data to be transmitted;

the TCP driver performing one or more operations that result in the data being transmitted to the network component;

in response to receiving the data, the network component creating one or more packets for transmission by packetizing the data; and the network component transmitting the one or more packets over the network.

2. The method of claim 1, wherein the TCP-A driver performs packet processing by processing each of the headers, the method additionally comprising fetching a next header of the one or more headers prior to completing the processing of the current header.

3. The method of claim 1, wherein the DMA engine resides on a chipset.

4. The method of claim 1, wherein the DMA engine resides on a host processor as a support module.

5. An apparatus for accelerating TCP (transport control protocol) processing by partitioning processing tasks between system elements in a way that scales with the elements, said method comprising:
a network component configured to:
receive an indication that one or more packets have been received from a network;
split each of the one or more packets into a header and a payload and post each header to a first buffer on a host and each payload to a second buffer on the host; and
notify a TCP (transport control protocol) driver that the one or more packets have arrived; and the TCP driver configured to:
perform packet processing by parsing the header in at least one of the one or more packets to determine the protocol context associated with a current connection, and perform TCP protocol compliance for the at least one of the one or more packets; and
perform one or more operations that result in a data movement module retrieving one or more payloads of the at least one of the one or more packets from the second buffer and placing the one or more corresponding payloads into a read buffer wherein the data movement module comprises a DMA (direct memory access) engine; and
receiving a request on an operating system to transmit data over the network; and
notify the TCP driver that data is ready to be transmitted; wherein:
the TCP driver is capable of performing one or more operations that result in the data being transmitted to the network component; and
the network component is capable of:
creating one or more packets for transmission by packetizing the data in response to receiving the data; and
transmitting the one or more packets over the network.

6. The apparatus of claim 5, wherein the TCP driver performs packet processing by processing each of the headers, and the TCP driver is additionally capable of fetching a next header of the one or more headers prior to completing the processing of the current header.

7. A system for accelerating TCP (transport control protocol) processing by partitioning processing tasks between elements, said system comprising:
a chipset having a DMA (direct memory access) engine, the chipset communicatively coupled to a TCP (Transport Control Protocol) driver of a processor and to a network component;
the network component configured to:
receive an indication that one or more packets have been received from a network;
split each of the one or more packets into a header and a payload and post each header to a first buffer on a host and each payload to a second buffer on the host; and
notify the TCP (transport control protocol) driver that the one or more packets have arrived; and the TCP driver of the processor configured to:
perform packet processing by parsing the header in at least one of the one or more packets to determine the protocol context associated with a current connection, and perform TCP protocol compliance for the at least one of the one or more packets; and
perform one or more operations that result in a data movement module retrieving one or more payloads of the at least one of the one or more packets from the second buffer and placing the one or more corresponding payloads into a read buffer wherein the data movement module comprises a DMA (direct memory access) engine; and
receiving a request on an operating system to transmit data over the network; and
notify the TCP driver that data is ready to be transmitted; wherein:
the TCP driver is capable of performing one or more operations that result in the data being transmitted to the network component; and
the network component is capable of:
creating one or more packets for transmission by packetizing the data in response to receiving the data; and
transmitting the one or more packets over the network.

8. The system of claim 7, wherein the TCP-A driver performs packet processing by processing each of the headers, and the TCP-A driver is additionally capable of fetching a next header of the one or more headers prior to completing the processing of the current header.

9. A machine-readable medium having stored thereon instructions, the instructions when executed by a machine, result in the following:
receiving an indication on a network component that one or more packets have been received from a network;
the network component splitting each of the one or more packets into a header and a payload and posting each header to a first buffer on a host and each payload to a second buffer on the host;
the network component notifying a TCP (transport control protocol) driver, by the network component, that the one or more packets have arrived;
the TCP driver performing packet processing by parsing the header in at least one of the one or more packets to determine the protocol context associated with a current connection, and performing, using the TCP driver, TCP protocol compliance for the at least one of the one or more packets to determine the protocol context associated with a current connection, and performing TCP protocol compliance for the at least one of the one or more packets; and
the TCP driver performing one or more operations that result in a data movement module retrieving one or more payloads of the at least one of the one or more packets from the second buffer and placing the one or more corresponding payloads into a read buffer, wherein the data movement module comprises a DMA (direct memory access) engine; and
performing, using the TCP driver, one or more operations that result in a data movement module placing one or more corresponding payloads of the at least one of the one or more packets into a read buffer comprises sending a request to a data movement module driver to write the one or more corresponding payloads to the read buffer; and
receiving a request on an operating system to transmit data over the network; the operating system notifying the TCP driver that there is data to be transmitted;
the TCP driver performing one or more operations that result in the data being transmitted to the network component;
in response to receiving the data, the network component creating one or more packets for transmission by packetizing the data; and
the network component transmitting the one or more packets over the network.

10. The machine-readable medium of claim 9, wherein the TCP-A driver performs packet processing by processing each of the headers, the instructions additionally result in fetching a next header of the one or more headers prior to completing the processing of the current header.

11. The machine-readable medium of claim 9, wherein the instructions that result in performing one or more operations that result in a data movement module placing one or more corresponding payloads of the at least one of the one or more packets into a read buffer additionally result in sending a request to a data movement module driver to write the one or more corresponding payloads to the read buffer.

12. The machine-readable medium of claim 9, wherein the DMA engine resides on a chipset.

13. The machine-readable medium of claim 9, wherein the DMA engine resides on a host processor as a support module.

* * * * *